(No Model.)
J. C. BUTLER.
CHECK ROWER.
No. 337,301. Patented Mar. 2, 1886.
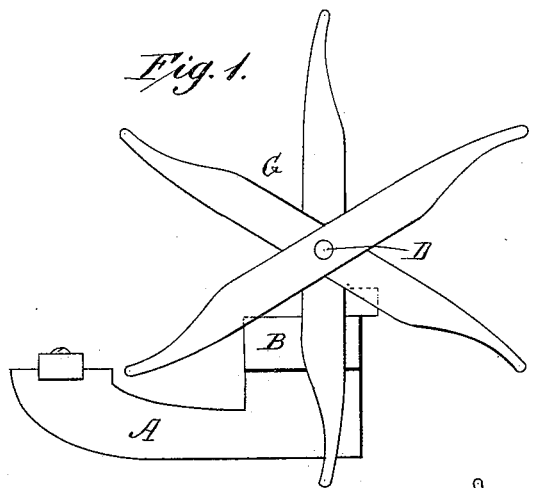
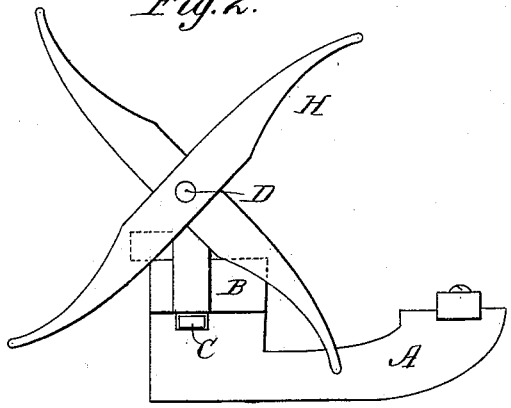
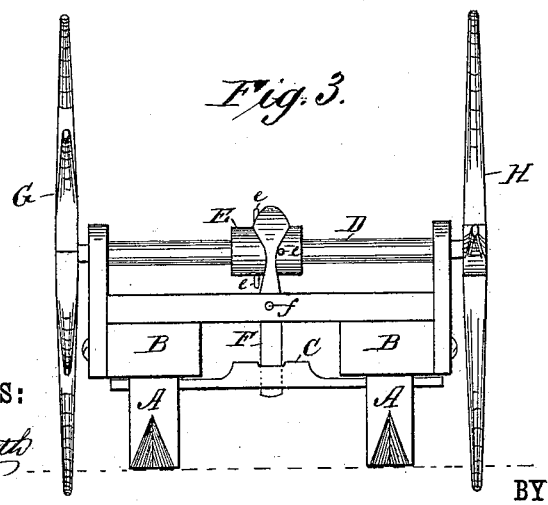
WITNESSES:
W. W. Hollingsworth
John C. Hennon
INVENTOR:
J. C. Butler
BY Munn & Co.
ATTORNEYS.

UNITED STATES PATENT OFFICE.

JEREMIAH C. BUTLER, OF LEXINGTON, MISSOURI, ASSIGNOR TO HIMSELF AND ETHAN ALLEN, OF SAME PLACE.

CHECK-ROWER.

SPECIFICATION forming part of Letters Patent No. 337,301, dated March 2, 1886.

Application filed September 16, 1885. Serial No. 177,252. (No model.)

*To all whom it may concern:*

Be it known that I, JEREMIAH C. BUTLER, a citizen of the United States, residing at Lexington, in the county of Lafayette and State of Missouri, have invented a new and useful Improvement in Check-Rowers, of which the following is a description.

This invention is an improvement in check-row planters; and it consists in certain novel constructions and combinations of parts, as will be hereinafter described and claimed.

In the drawings, Figures 1 and 2 are elevations of the opposite sides of a planter provided with my improvements, and Fig. 3 is a rear elevation of same.

The runners or flukes A, seed-boxes B, and slide C may be of the ordinary construction. The dropping-shaft D is journaled in suitable bearings, and extends slightly beyond the seed-boxes on opposite sides. On this shaft, between its ends, is fixed a drum or roller, E, having two rows of pins or studs, e, arranged on opposite sides of an intermediate line. A lever, F, is pivoted at f, and has its lower end engaged with the dropping-slide. The other or upper end of the lever rests between the rows of pins e, and it is inclined on opposite sides at the points where the pins engage. By this construction the pins which are arranged alternately will strike the lever, and force it first in one and then in the other direction. The shaft-revolving wheel G is secured on one and the marking-wheel H on the other end of the shaft D. Both these wheels are rimless, and the outer ends of their spokes are curved, as shown. The revolving wheel has its arms curved rearwardly, and the marking-wheel has its arm curved forward, the description of said curvature being made with reference to the line of operative revolution. By the forward curvature of the arms of the marking-wheel such arms or spokes in leaving the ground throw it up, so that a clear, distinct mark is made. The curvature of the spokes of the wheel G to the rear renders such wheels more likely to be caught by the ground, and enables them to leave the ground without displacing the soil or leaving any considerable mark.

The invention is simple, and will be readily understood from the foregoing description.

Having thus described my invention, what I claim as new is—

The improved check-rower, substantially as herein described and shown, consisting of the main or supporting frame, the seed-boxes, the dropping-slide, the shaft journaled in the main frame, connections between the shaft and the dropping-slide, whereby the latter may be oscillated, the rotating wheel secured on one end of the shaft and provided with spokes having their extremities curved forward with reference to the direction of revolution, and the marking-wheel secured on the opposite end of the shaft and provided with spokes having their extremities curved rearwardly, all arranged and operating substantially as and for the purposes specified.

JEREMIAH C. BUTLER.

Witnesses:
S. S. REEDER,
JNO. REID MORELAND.